F. E. BAKER.
INTERNAL COMBUSTION ENGINE.
APPLICATION FILED JAN. 6, 1914.

1,132,425.

Patented Mar. 16, 1915.

WITNESSES
W. E. Baker, Jr.
A. D. Rollhaus

INVENTOR
FRANK EDWARD BAKER
BY Memmler
ATTORNEYS

UNITED STATES PATENT OFFICE.

FRANK EDWARD BAKER, OF BIRMINGHAM, ENGLAND.

INTERNAL-COMBUSTION ENGINE.

1,132,425.      Specification of Letters Patent.      Patented Mar. 16, 1915.

Application filed January 6, 1914. Serial No. 810,640.

*To all whom it may concern:*

Be it known that I, FRANK EDWARD BAKER, a subject of the King of Great Britain, residing at Birmingham, England, have invented certain new and useful Improvements in Internal-Combustion Engines, of which the following is a specification.

This invention relates to internal combustion engines such as are used for propelling motor cycles and other motor vehicles and refers more particularly to the type of engine in which a change-speed gear is contained in the crank casing.

The object of the invention is to construct an improved engine of the type aforesaid.

Figure 1:
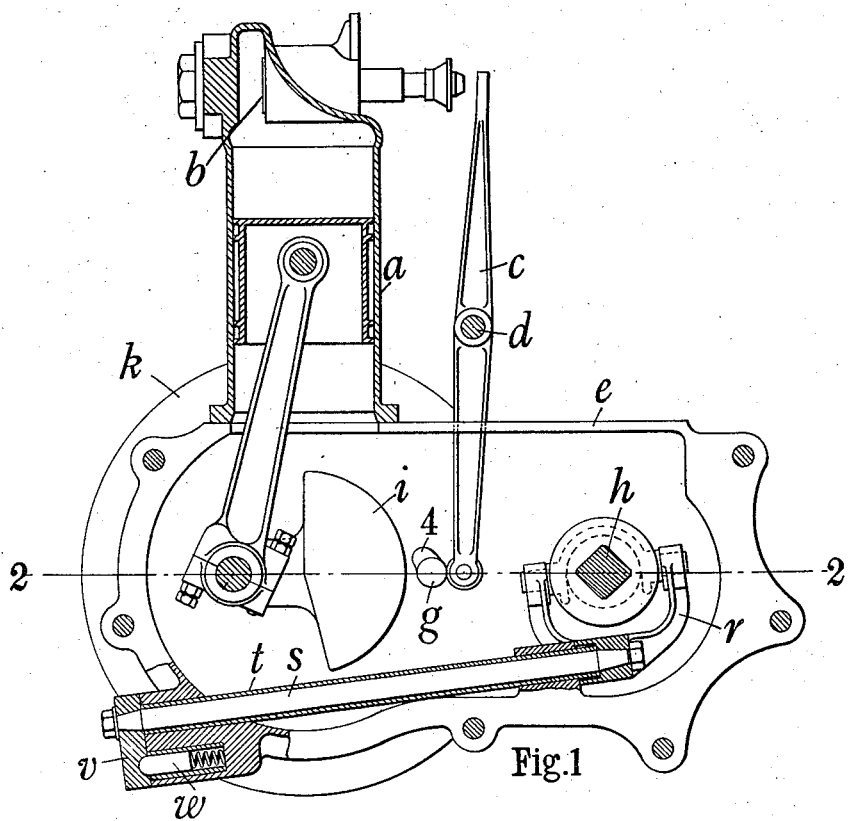
Figure 2:
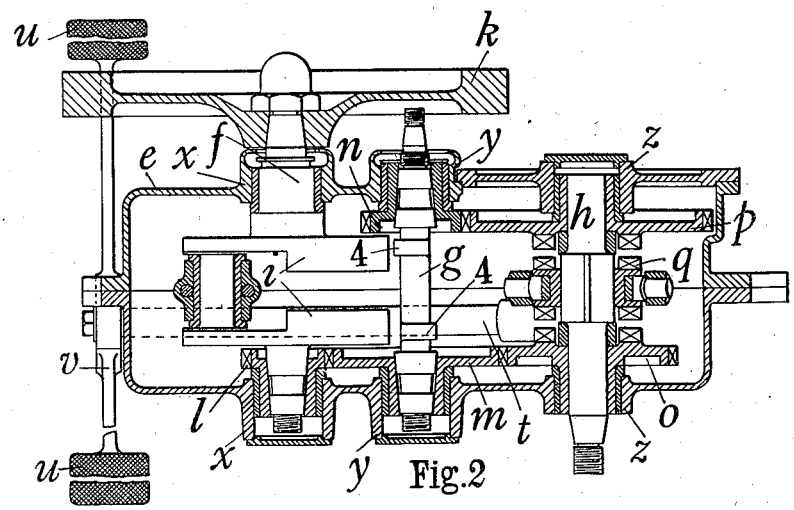

Referring to the accompanying drawings which illustrate the invention carried into effect in one convenient manner:—Figure 1 is a sectional elevation of an engine for a motor cycle constructed according to the invention. Fig. 2 is a sectional plan view on line 2, 2.

The cylinder $a$ which may be either air or water cooled is provided with horizontal overhead valves $b$ which are operated by tappet levers $c$ pivotally connected at $d$ to the crank casing $e$. The latter is formed in two parts in the usual manner and is provided with ordinary bearings $x$, $y$, $z$, to receive the crank shaft $f$, cam shaft $g$ and the change speed gear and driving axle $h$ respectively.

The crank shaft $f$ which is preferably provided with balance weights $i$ projects through the casing $e$ and is provided with a fly-wheel $k$.

Secured to the shaft $f$ is a gear wheel $l$ which meshes with a gear wheel $m$ fast on the cam shaft $g$, a second gear wheel $n$ being secured to the opposite end of the latter. These two wheels $m$ and $n$ drive two gear wheels $o$ and $p$ respectively which are loosely mounted on the axle $h$. The wheels $o$, $p$ are adapted to drive the axle $h$ at a greater or less speed according to which of them is engaged by the clutch coupling $q$ slidably carried on the squared portion of the axle.

The coupling $q$ is operated by the forked lever $r$ which is connected to the shaft $s$. The latter is carried in a bearing $t$ formed in the crank case $e$ and projects from the forward end of the same. The end of the shaft $s$ is provided with an operating foot lever $u$ which extends on either side of the case $e$ to a position convenient for the operator. A spring pressed locking bolt $w$ carried in the casing $e$ is adapted to enter recesses formed in the boss $v$ of the foot lever to retain and lock the clutch $q$ in the position to which it is set.

Cams 4, 4 on the before mentioned cam shaft are adapted to rock the tappet levers $c$ to operate the valves $b$ in the usual manner.

The axle $h$ is provided at its outer end with any desired driving means such as a pulley, sprocket wheel, or worm wheel.

In use the gear wheels $l$, $m$, $n$, $o$, $p$ and the cam shaft $g$ are constantly revolving. The shaft $h$ is driven at a greater or less speed by the wheels $m$ or $n$ respectively by throwing the clutch $q$ into engagement with either of the wheels $o$ or $p$. The clutch is operated by the foot lever $u$ and retained in the adjusted position by the locking bolt $w$ as before described.

What I claim as my invention and desire to secure by Letters Patent is:—

In internal combustion engines, the combination comprising a crank case, a crank shaft, a cam shaft, and a driven shaft, all mounted parallel with each other within the crank case, a pair of wheels loosely mounted on the driven shaft, a pair of wheels secured to the cam shaft and meshing with the wheels on the driven shaft, a wheel on the crank shaft meshing with one of the wheels on the cam shaft, valve operating cams on the said cam shaft, a sliding clutch on the driven shaft adapted to secure to the said shaft either of the wheels mounted thereon, a clutch fork, a clutch shaft carrying the said fork and journaled within the crank case, and a pedal lever secured to the outer end of the clutch shaft, substantially as described.

In testimony whereof I have signed my name to this specification in the presence of two subscribing witnesses.

FRANK EDWARD BAKER.

Witnesses:
    JOHN MORGAN,
    EDWARD SILL.